(12) United States Patent
Elms

(10) Patent No.: US 7,334,018 B2
(45) Date of Patent: Feb. 19, 2008

(54) UNIFIED NETWORK RESOURCES

(75) Inventor: Kim Elms, Carindale (AU)

(73) Assignee: SAP Aktiengesellschaft, Walldorf (DE)

( * ) Notice: Subject to any disclaimer, the term of this patent is extended or adjusted under 35 U.S.C. 154(b) by 866 days.

(21) Appl. No.: 10/384,762

(22) Filed: Mar. 11, 2003

(65) Prior Publication Data

US 2004/0181578 A1  Sep. 16, 2004

(51) Int. Cl.
 *G06F 15/16* (2006.01)
(52) U.S. Cl. ................................ 709/205; 709/229
(58) Field of Classification Search .................... None
 See application file for complete search history.

(56) References Cited

U.S. PATENT DOCUMENTS

| | | | | |
|---|---|---|---|---|
| 5,446,842 A | * | 8/1995 | Schaeffer et al. | 709/205 |
| 5,539,886 A | * | 7/1996 | Aldred et al. | 719/318 |
| 5,987,376 A | * | 11/1999 | Olson et al. | 701/201 |
| 6,560,636 B2 | * | 5/2003 | Cohen et al. | 709/203 |
| 7,124,185 B2 | * | 10/2006 | Kuroyanagi | 709/225 |
| 2002/0143878 A1 | * | 10/2002 | Birnbaum et al. | 709/205 |

FOREIGN PATENT DOCUMENTS

| | | |
|---|---|---|
| EP | 1 022 664 A | 7/2000 |
| WO | WO01/63466 A | 8/2001 |
| WO | WO01/86487 A | 11/2001 |
| WO | WO02/080016 A | 10/2002 |

* cited by examiner

*Primary Examiner*—John B. Walsh
(74) *Attorney, Agent, or Firm*—Fish & Richardson P.C.

(57) ABSTRACT

A session manager within an application server may maintain multiple sessions with a plurality of network users, where the network users may be remote from the network. The session manager may provide the remote users with a selection of network resources, by adding a connection to the network resources to an application requested by one or more of the users. In this way, pre-configured applications may be used to provide remote network resource usage. Examples of network resources which may be provided in this manner include remote printing, multi-user collaboration sessions, and remote data storage.

41 Claims, 18 Drawing Sheets

UNIFIED NETWORK RESOURCES

TECHNICAL FIELD

This description relates to remote usage of networking resources.

BACKGROUND

Examples of computer network resources, as may be provided by an enterprise or other network provider, include printing, electronic mail (email), and data storage. Such network resources, as well as many other types of network resources, are often desired by remote users of the network. For example, sales personnel of an enterprise might require access to network resources while at a customer location.

Conventional techniques exist for providing some level of remote usage of such network resources. For example, a local printer at a home office may be configured to allow a user to perform a print job from a remote location. As another example, an application run by the network may be written (or re-written) so as to provide remote usage of at least some network resources.

SUMMARY

According to one general aspect, application content is called during a session opened with a user, in response to a user request, the application content is augmented with a connection to network resource information about a network resource, to thereby produce augmented application content, and the augmented application content is provided to the user via the session.

Implementations may have one or more of the following features. For example, a network resource order may be received via the connection, and the network resource order may then be implemented.

The augmented application content may be provided via a remote connection with the user. The network resource may be a printer, an email server, or network storage. In the latter case, a network resource request may be received via the connection, and a directory structure of network storage space available to the user may be presented.

A use of the network resource may be handled on behalf of the user and in response to a user request. In this case, the session may include a first user and a second user, and the network resource may be a united user session allowing the first user and the second user to participate therein, and to thereby view the application content. Further, the application content may be modified based on a modification performed by the first user, the application content may be updated in response to the modification, and the updated application content may be provided to the second user. In modifying the application content, the modification may be received within a first hidden browser frame that is not viewable by a first browser being accessed by the first user, and a view of the modification may be provided to the second user via a second hidden browser frame not viewable within a second browser being accessed by the second user.

According to another general aspect, a computer has a storage medium with a program stored thereon, where the program is accessible by a processor for implementation thereof. The program comprises a first code segment for receiving application content from an application repository during a live connection with a user, a second code segment for adding a link within the application content, the link providing the user with access to a resource selection framework for selecting a network resource, a third code segment for providing the application and included link to the user, and a fourth code segment for receiving a network resource selection from the user.

Implementations may have one or more of the following features. For example, the instructions may include a fifth code segment for managing a network resource on behalf of the user and in accordance with the network resource selection.

The live connection may be a remote connection with the user, and the network resource may be a printer, a storage database, or an email server.

The network resource may be a united user session operable to permit a first user and a second user to concurrently view the application content and included link. In this case, the instructions may include a fifth code segment for associating a browser frame that is non-viewable to the first and the second user with the application content, where the browser frame incorporates information regarding operations of a first user with respect to the application content for display thereof to the second user.

According to another general aspect, a resource management system may include an application interface operable to access application content in an application database, a resource handler operable to interface with a network resource, and a session manager operable to obtain the application content via the application interface, augment the application content with a connection to network resource information within the resource handler, and output the augmented application content to a user.

Implementations may have one or more of the following features. For example, the resource handler may be further operable to monitor a status of the network resource and access rights of the user to the network resource. The connection to network resource information may provide a link to a resource selector interface provided to the user by the session manager in conjunction with the resource handler.

The application interface may present the application content to the session manager in a format amenable to inclusion of the connection to network resource information. The application interface, resource handler and session manager may be co-located within a server having access to the network resource.

The session manager may be a proxy server located separately from a server housing the application interface and the resource handler. The network resource may be a printer, a storage database or an email server.

The session manager may be further operable to track inputs of a plurality of concurrent users of an active session. In this case, a first user may invite a second user to participate in a live session via an email server accessed via the connection to network resource information. Alternatively in this case, each of the plurality of users may view the application content on a graphical user interface supporting frames. Further, the session manager may be further operable to track an input of a first user of the plurality of users via a first frame that is non-viewable to the first user, and output the input to remaining ones of the plurality of users via a second frame that is non-viewable to the remaining ones of the plurality of users. The session manager may be an application written as a Java servlet.

Also, the session manager may dynamically construct a page for viewing by the user on a graphical user interface, where the page includes the application content and the connection to network resource information. In this case, the page may further include a hidden frame that is operable, via the session manager, to track modifications to the application content entered by a first user and report the modifications to remaining users. Further, the session manager may be further operable to highlight a portion of the page being modified by the first user, as the page is being concurrently viewed by the remaining users.

The session manager may be further operable to receive a network resource request from the user, based on the connection to network resource information, and manage a usage of the network resource by the user on the user's behalf.

According to another general aspect, a system for providing access to a network resource includes means for obtaining application content, means for augmenting the application content to include a connection to information about the network resource, means for outputting the augmented application content to a user, means for receiving a network resource request from the user, and means for managing the network resource to thereby fulfill the network resource request with the network resource.

Implementations may have one or more of the following features. For example, the means for obtaining application content may include an application interface for interfacing with an application database. The means for augmenting the application content, the means for outputting the augmented application content, and the means for receiving the network resource request may include a session manager operable to add a link to the application content, transmit the application content and link to the user, and input the network resource request in response to a selection of the link by the user. Also, the means for managing the network resource may include a resource handler operable to provide information about the network resource.

The details of one or more implementations are set forth in the accompanying drawings and the description below. Other features will be apparent from the description and drawings, and from the claims.

DETAILED DESCRIPTION

Figure 1:
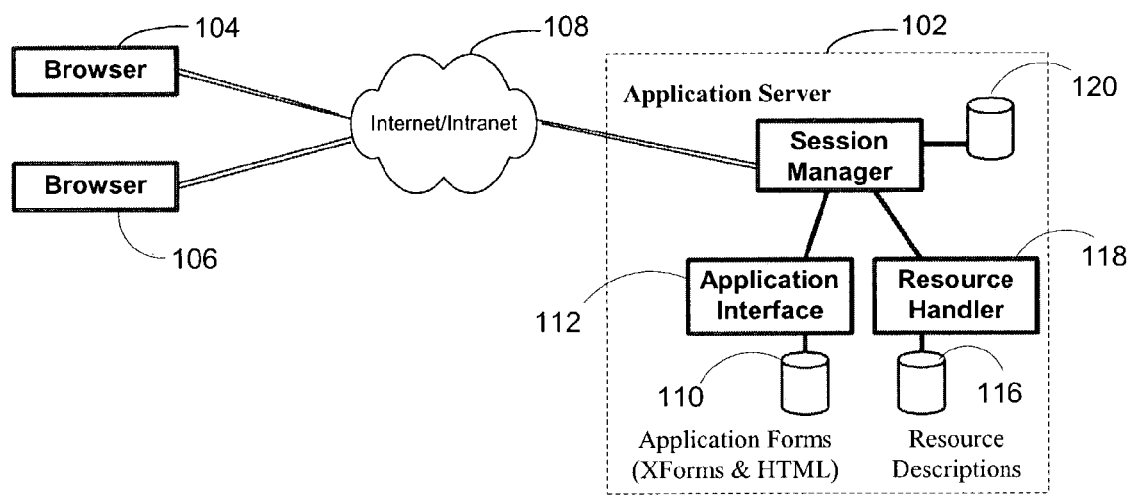
FIG. 1 is a block diagram of a system for providing remote usage of network resources.

FIG. 1 is a block diagram of a system 100 for providing remote usage of network resources. In FIG. 1, an application server 102 interacts with a plurality of browser applications, including a first browser 104 and a second browser 106, via a network 108. The browsers 104 and 106 represent, for example, web browsers using the programming language Hypertext Markup Language ("HTML"), such as Internet Explorer by Microsoft. The web browsers 104 and 106, however, could also be other types of browsers, or other types of client-side, user interface applications. For example, the browser 104 might represent a user interface on a handheld device, or any type of user interface based on a programming language other than HTML. The network 108 may represent the public Internet, or may represent some other type of wide area network ("WAN"), such as a wide-area intranet operated by an enterprise.

The application server 102 may be part of a network, such as a local area network ("LAN") located at an enterprise or other provider of network services. The application server 102 may represent a plurality of similar application servers in communication with one another, depending upon a scale of usage of the relevant network. Typically, a user of the browser 104 or 106 might connect to the application server 102, via network 108, using one of a plurality of connection techniques. For example, the user might connect to the enterprise LAN using a dial-in connection, or might make use of a wireless connection. The connection may be secured by a variety of techniques; for example, the user might form a virtual private network ("VPN") connection to the enterprise LAN. Such connections may be made through a gateway or firewall device (not shown), which allow protection and shielding of local network resources by, for example, requiring authentication and/or authorization of the user. Such security functionality also may be incorporated within the application server 102 itself.

The application server 102 is generally designed to provide applications to a user of the browsers 104 or 106. For example, in an enterprise setting, the application server 102 may provide customer management applications, order entry/fulfillment applications, billing applications, employee records, enterprise records, or any other of a number of business applications. In this way, for example, a salesperson at a customer location may access the application server in order to facilitate a sale to the customer, by entering the sale order and/or a record of the customer's information, checking the customer's previous orders, or billing the customer's account.

In the discussion herein, business applications are discussed which include forms for entering or otherwise manipulating or sharing information. Many other types of applications, however, may also be used in connection with the application server 102. In FIG. 1, application forms are stored in an application forms database 110 within the application server 102.

Such applications may be written in, for example, HTML or Extensible Markup Language ("XML"). Often, the various applications (or application versions) are written and/or modified over a relatively long period of time, using multiple programming languages and techniques. As a result, and particularly when considering applications designed and used by a plurality of different enterprises, such applications may have a high level of non-uniformity with respect to one another.

For example, an enterprise might employ a customer management application including a database application listing all customer records. The database application may have a particular format and/or access technique, which may be too complicated or too enterprise-specific to be made practically available, on a direct basis, to customers, employees, or partner enterprises. It is generally possible to re-write the (in this example) customer database application to perform desired functions and interactions; however, such wholesale re-writing of applications often may be too expensive or too time-consuming for an enterprise to undertake.

As discussed in more detail below, the application server 102 is inter-operable with many types of applications, and provides access to network resources in a quick, easy, and efficient manner, without requiring extensive re-writing or re-working of the applications themselves.

In FIG. 1, then, an application interface 112 obtains a desired application from the application database 110, and provides the application to a session manager 114. The session manager 114 is responsible for initiating and maintaining an active session between the users of the browsers 104 and 106, and the application server 102. The ability of the session manager 114 to maintain a single active session that includes a plurality of users allows the users to exchange some level of information among one another within that session.

More specifically, the session manager 114 maintains an inventory of information regarding which users are currently active and connected to the application server 102, along with information about a current state of each user connection. For example, the session manager might track that "user X is connected to application 1, and is currently viewing form 1A."

Upon receiving an application from the applications database 110 through the applications interface 112, the session manager 114 augments the application with network resource information, and then forwards the augmented application to one or more of the users of browsers 104 and 106. In the examples discussed below, the session manager 114 provides a link or connection to a menu of network resources, whereupon the user may select one or more of the network resources.

A listing of available network resources is maintained in a resource descriptions database 116. A resource handler 118 interfaces between the resource descriptions database 116 and the session manager 114, so that the session manager 114 is aware of which resources are currently available, and/or which resources a particular user has rights to use. In this way, the session manager can provide up-to-date resource information to the user when augmenting an application in the manner just described.

In FIG. 1, the network resources themselves are represented by a database 120, with which the session manager interacts directly upon instructions from the user(s). Of course, the resources could also be a plurality of databases or interconnected databases, or a variety of other devices, such as an email server or a print server. Since there may be a large number of network resources, and since the session manager 114 is generally already in connection with all of them (in order to provide their services to the user(s)), FIG. 1 demonstrates that the resource handler 118 tracks status information about the network resources through the session manager 114. However, it is also possible that the resource handler may be directly connected to one or more of the network resources.

In one implementation, the session manager 114 may be written as a java servlet application. A Java servlet is a server-side program, written in the programming language Java, that may be executed from within a plurality of other applications, including remote, client-side applications. Java servlets allow dynamic interactions with users. For example, when a user fills out a form listing the user's name, address, and other personal information, a Java servlet allows for this information to be input, and for a confirmation screen confirming the entered information to be separately generated, based on the user information previously entered. A Java servlet is persistent, meaning that, once invoked, it can be maintained in memory and can fulfill multiple requests. The session manager 114, however, may be written as a variety of applications, and/or in a number of different programming languages. For example, the application server 114 could be written as a Common Gateway Interface (CGI) program.

As described above, the application server 102 provides users with an ability to make use of network resources from a remote location, and manages this usage of network resources on the user's behalf. In so doing, the application server may use pre-existing applications associated with an enterprise, and allows a user to, for example, interact with other users in a manner controlled by the user.

Figure 2:
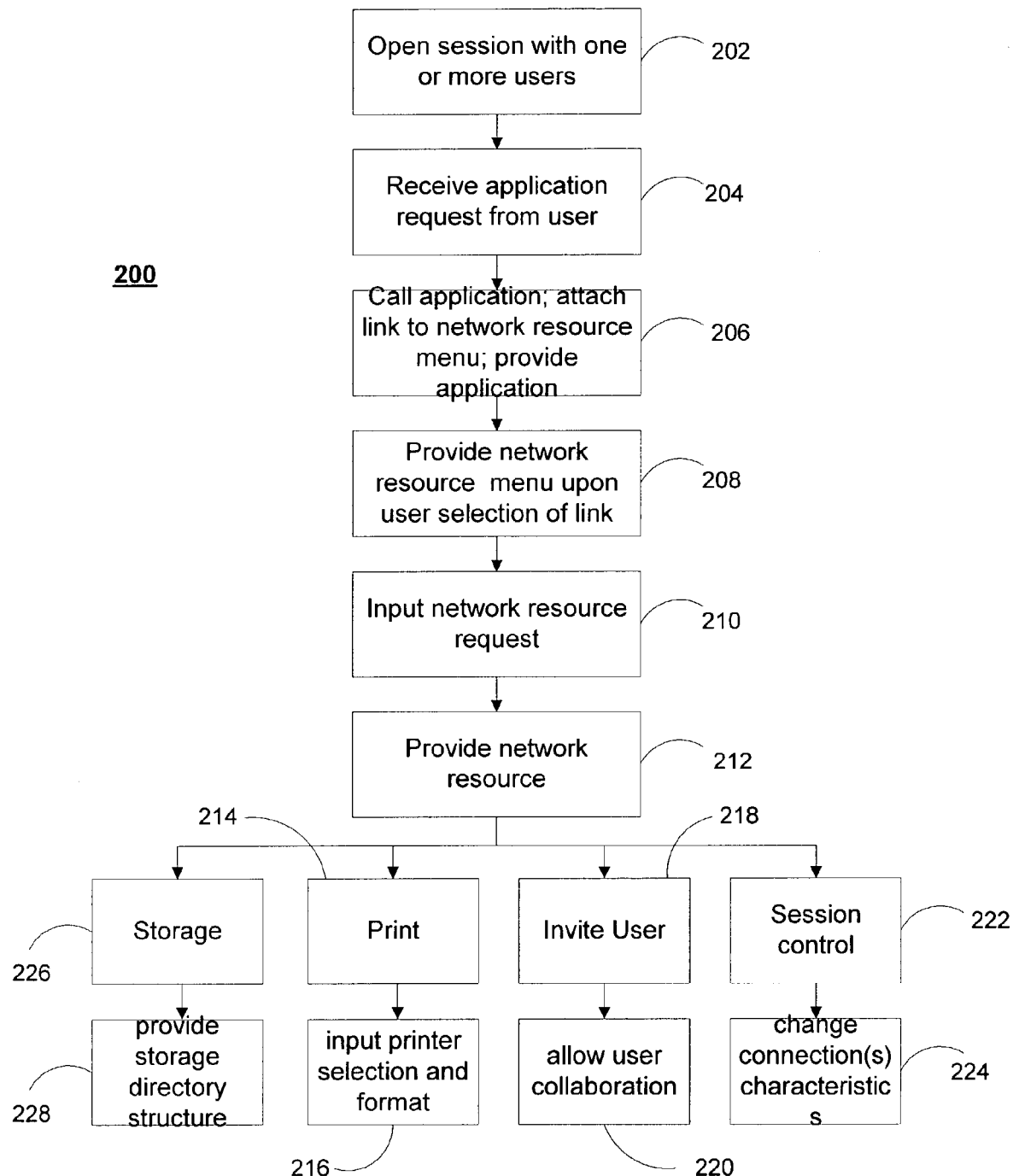
FIG. 2 is a flowchart illustrating an operation of the system of FIG. 1.

FIG. 2 is a flowchart 200 illustrating an operation of the system of FIG. 1. Initially, the session manager 114, upon request, opens a session with one or more of the users of browsers 104 and/or 106 (202). Subsequently, the session manager 114 receives a request or an application from one of the users (204). For example, the user may request an order form for processing a purchase request. In response to the application request, the session manager 114, via the application interface 112, obtains the requested application from the application database 110. The session manager 114 then augments the application form by attaching a link or other type of connection to a network resource menu, and provides the augmented application to the requesting user (206).

Upon a selection of the network resource menu link by the user, the session manager 114 provides the network resource menu itself to the user (208). As discussed below, the network resource menu may contain a plurality of network resources. The session manager 114 may populate the network resource menu based on a description of available resources that is available in the resource description database 116, where, as described above, the session manager 114 interacts with the resource description database 116 via the resource handler 118. Subsequently, the user selects a particular network resource from those listed on the network resource menu (210), whereupon the session manager provides the network resource to the user, and operates the network resource on the user's behalf (212).

As mentioned above, there are many different types of network resources which might be provided to the user in this manner. For example, one network resource which might be provided to the user is a printing functionality (214). In this context, the session manager 114 provides the user with a listing of available printers, based on, for example, the user, the user's current location, and/or the list of available printers as provided by the resource handler 118. In this way, the user may send information for printing, without requiring pre-configuration of the particular printer with the application in question.

Another example of network resource that may be made available to the user is the ability to invite another user into the active session (218). In this way, the application server 102 allows users to collaborate with one another with respect to a particular application form (220). For example, one user may be able to fill out a first part of an application form, while a second user may fill out a second portion of the application form. As discussed in more detail below, the application server 102 may utilize e-mail as a means to invite other users into a particular session.

As another example of network resources that may be made available to the user, the session manager may allow varying levels of session control to the user (222). In this way, the user may be allowed to modify current connection characteristics of his or her own connection, or connections of other users (224). For example, the user may restrict a permission given to a particular user to alter a particular portion of a given application form, or may disconnect a particular user from a session.

As a final example of a network resource that may be provided to the user, the session manager 114 may allow the user to use network storage facilities from a remote location (226). In this context, the session manager 114 may provide a storage directory structure to the user (228), so that the user may select a particular directory, folder, or file in which to store the associated application form. Examples of some of the above-mentioned network resources being provided to a user, along with other examples not yet mentioned, are discussed below with respect to FIGS. 3-20.

Figure 3:
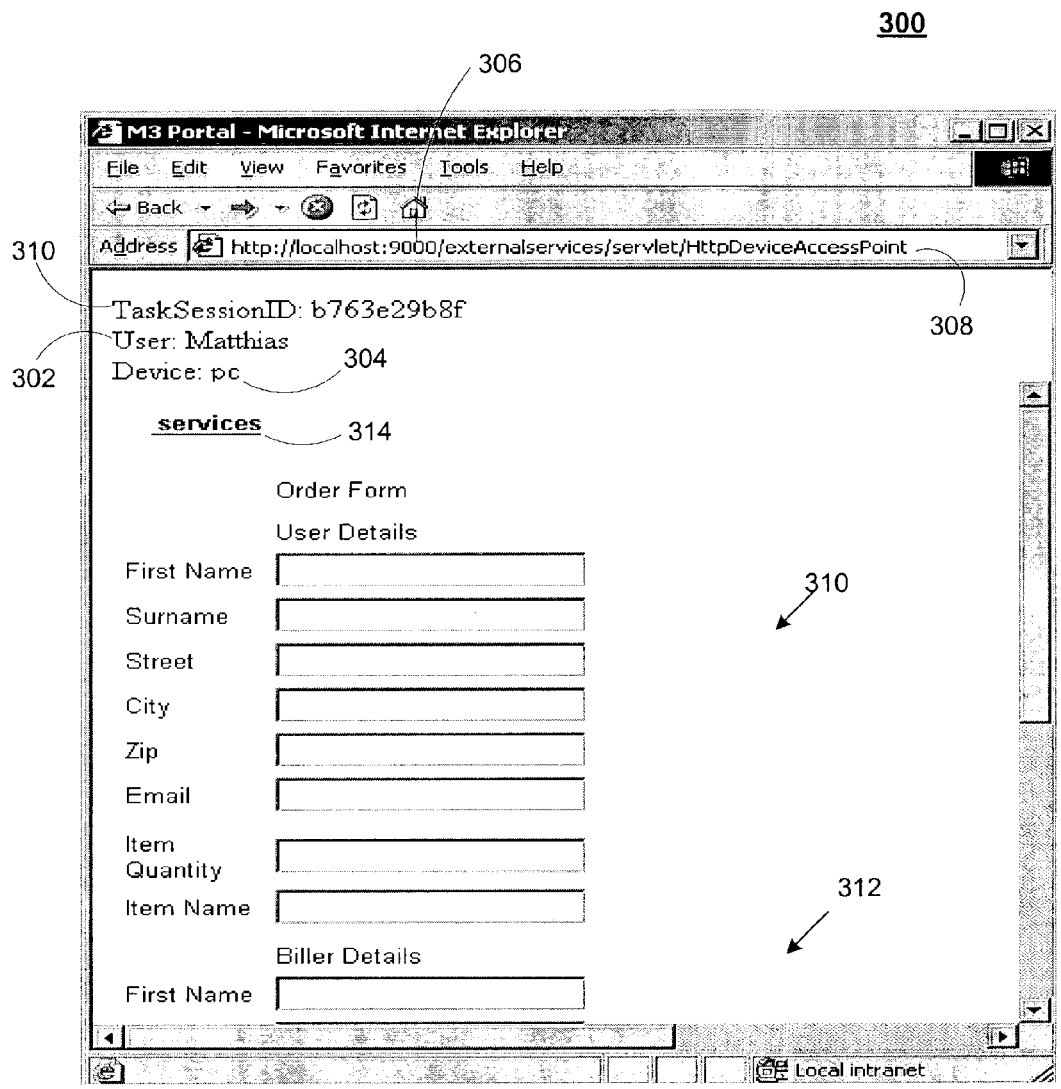
FIG. 3 is a screenshot of an application form requested by a user and augmented with a connection to a network resource menu.

FIG. 3 is a screenshot 300 of an application form requested by a user and augmented with a connection to a network resource menu. In FIG. 3, it is assumed that a particular user on a given device is authenticated with respect to a particular port number on the application server 102. Specifically, in screenshot 300, a line 302 indicates that a user named "Matthias," using a personal computer ("PC"), as indicated in a line 304, is authenticated via a port number "9000," as demonstrated in a portion 306 of a uniform resource locator ("URL") 308. Further, a line 310 indicates a task session identification number that is unique to the currently-active session, and associated with the user identified in the line 302.

Further in the screenshot 300, a section 310 contains various fields associated with a customer's information, such as customer's name, address, e-mail address, and vital information that the customer may be ordering. Another section 312 contains various fields for entering similar information corresponding to a biller associated with the order (e.g., a salesperson at a customer site, and/or an enterprise providing the goods for sale).

A "services" link 314 provides the user with a connection to a network resource menu, as described herein in more detail. The services link 314, as described above, was added to the current application by the session manager 114, after the session manager 114 obtained the application form from the application forms database 110 via the application interface 112, but before the application form was actually rendered to the current user. In screenshot 300, the services link 314 was added by the session manager 114 in a portion of the screenshot 300 close to the session, user, and device information contained in lines 310, 302, and 304, respectively. However, the services link 314 could be placed within any desired portion of the screenshot 300. In one implementation, the application interface 112 may include logic for analyzing a particular application form to be augmented with the services link 314, whereupon the application interface 112 may be capable of determining an optimal location for placement of the services link 314. This implementation may be particularly useful with respect to application forms which contain extensive amounts of information prior to being augmented with the services link 314.

Figure 4:
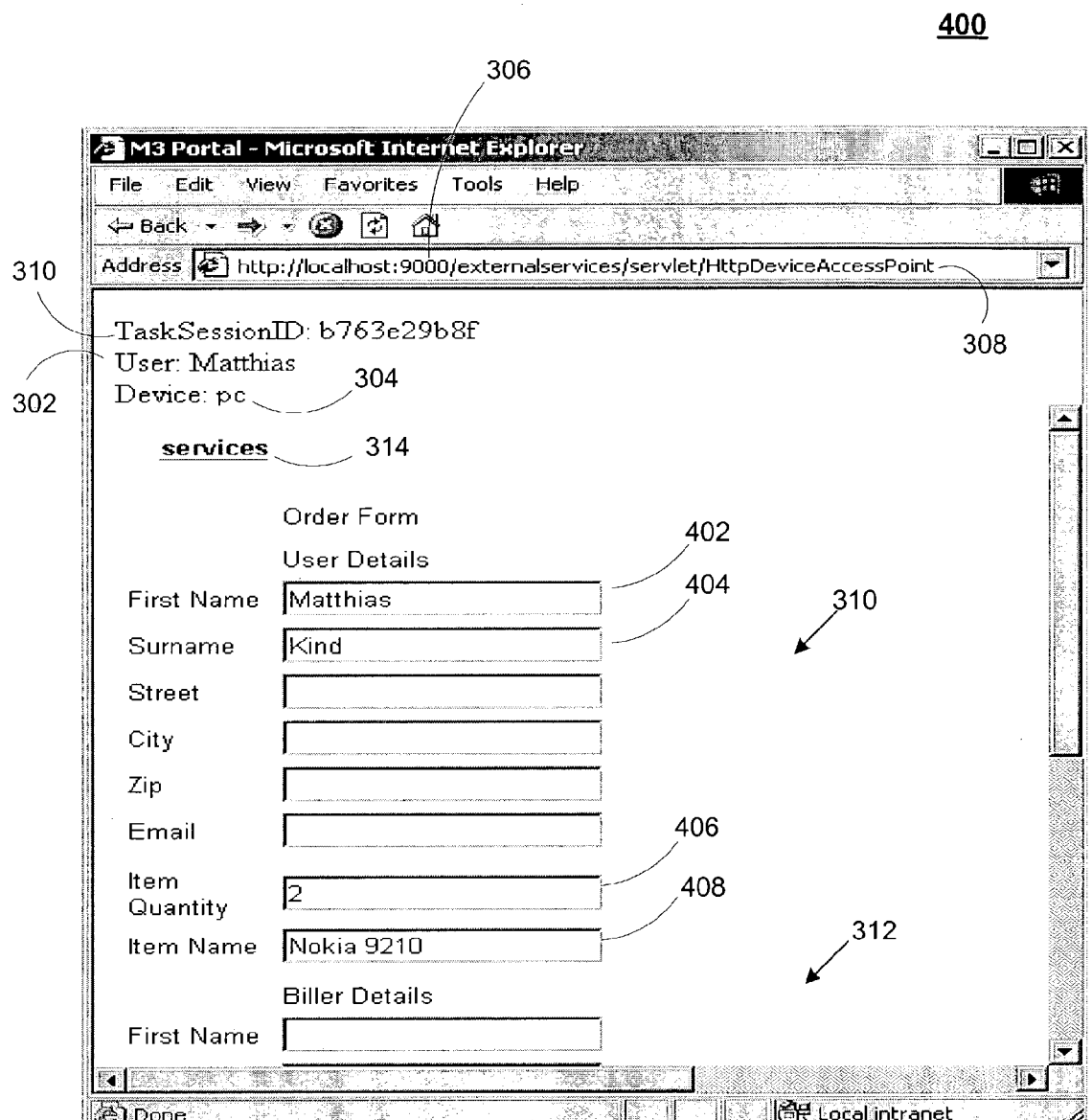
FIG. 4 is a screenshot illustrating a partially-filled in version of the screenshot of FIG. 3.

FIG. 4 is a screenshot 400 illustrating a partially-filled in version of screenshot 300 of FIG. 3. Specifically, in the screenshot 400, a "First Name" field 402 has been filled in with the name "Matthias," while a "Surname" field 404 has been filled in with the name "Kind." Similarly, an "Item Quantity" field 406 has been filled in with the numeral "2," and "Item Name" field 408 has been filled in with the phrase "Nokia 9210." Upon filling in these and/or other fields within the section 310 and/or 312, the user may "click on" the services link 314, to thereby be provided with a network resource menu, as discussed below with respect to FIG. 5.

Figure 5:
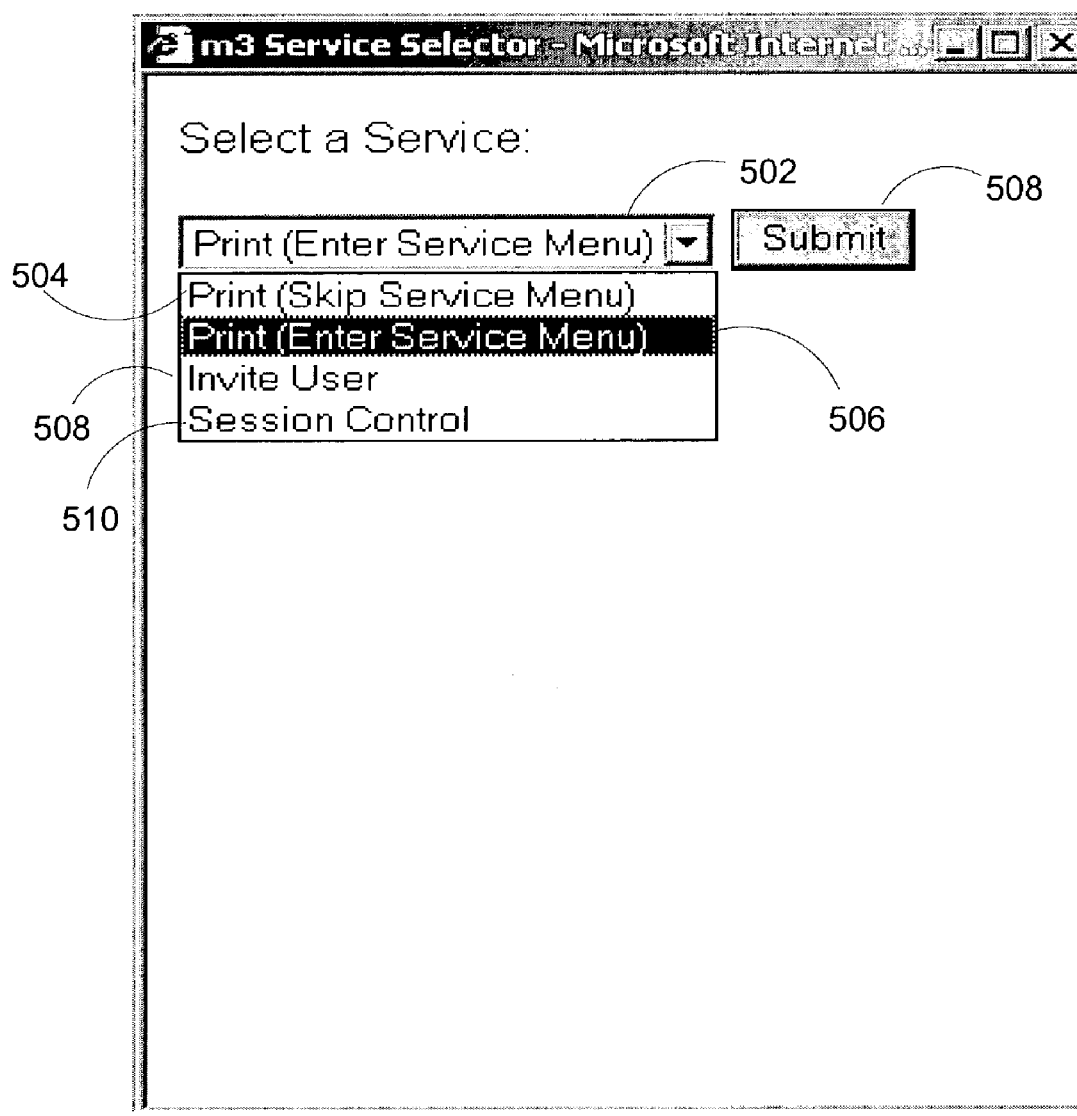
FIG. 5 is a screenshot of a network resource menu.

FIG. 5 is a screenshot 500 of a network resource menu. In screenshot 500, the user has selected the services link 314, and has been provided with a drop down menu 502 providing a listing of currently-available network resources. Specifically, the drop down menu 502 includes a first print option 504, a second print option 506, an "invite user" option 508, and a session control option 510. In FIG. 5, the user has selected the second print option 506, whereupon the user selects a submit button 508 to submit the selected option to the application server 102 (i.e., to the session manager 114).

Figure 6:
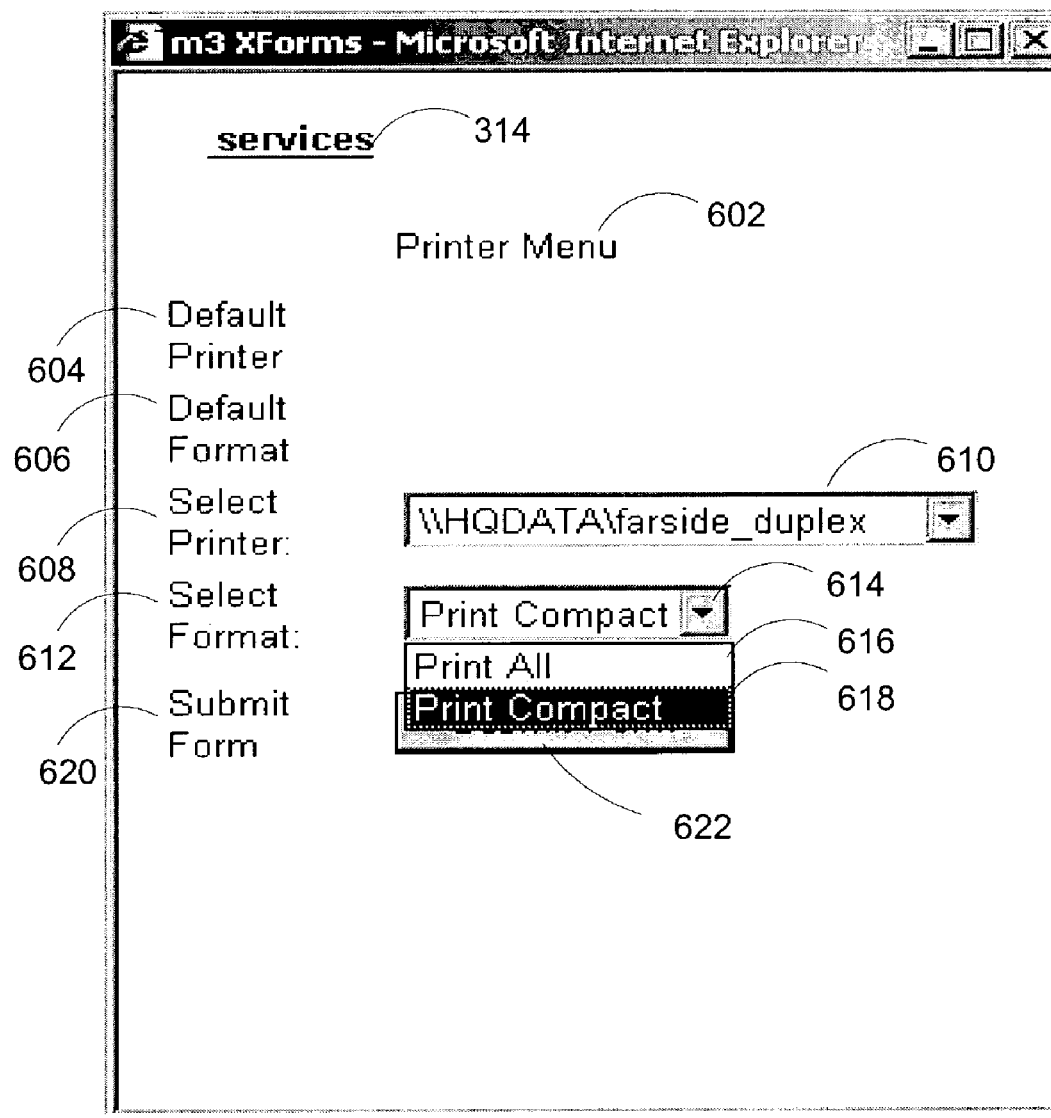
FIG. 6 is a screenshot illustrating a menu related to a specific network resource.

FIG. 6 is a screenshot 600 illustrating a menu related to a specific network resource. Specifically, the screenshot 600 is presented to the user in response to the selection of the second print option 506 in screenshot 500, and provides the user with various print options. It should be understood from screenshot 500 that the user may skip the use of screenshot 600 by selecting the first print option 504; in this case, the user would proceed directly to a printing functionality. It should also be understood that, in some cases, the screenshot 600 could also be provided to the user directly in response to the user selection of the services link 314. Similarly, the services link 314 could provide access to any particular network resource directly, as opposed to first providing the network resource menu 502.

In screenshot 600, a printer menu 602 is presented. Specifically, a line 604 provides space for listing a default printer, while a line 606 provides space for listing a default print format. A line 608 provides a dropdown menu 610 which allows the user to select a particular printer from among a plurality of available printers. Similarly, a line 612 provides a dropdown menu 614 which allows the user to select a print format. Specifically, the dropdown menu 614 provides the user with a first selection 616 which allows the user to print all of a selected screenshot, as well as a line 618 which allows the user to print a compressed or compact version of the selected screenshot. Finally with respect to the screenshot 600, a line 620 allows the user to submit the print request using a button 622 (which is partially obscured in FIG. 6 by the selections 616 and 618 listed from within the dropdown menu 614).

Figure 7:
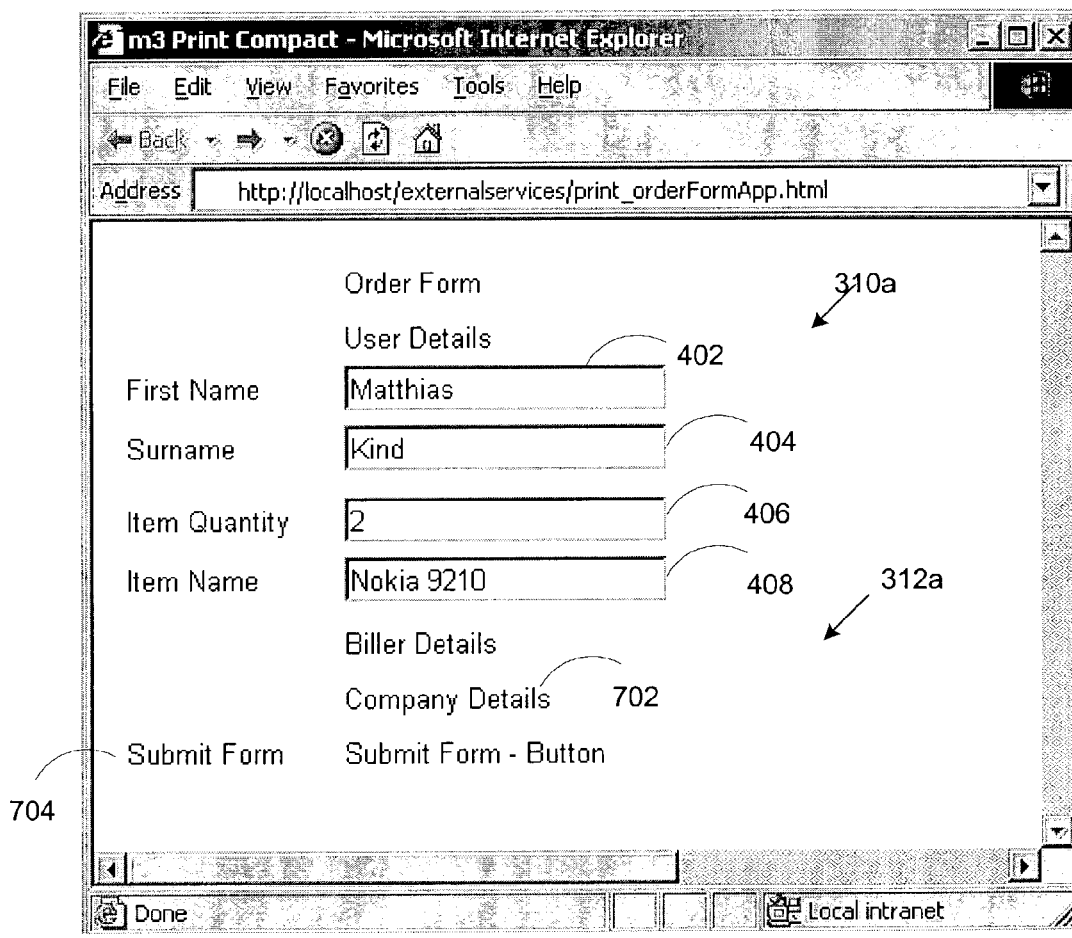
FIG. 7 is a screenshot illustrating information to be printed.

FIG. 7 is a screenshot 700 illustrating information to be printed. More specifically, the screenshot 700 is a compressed version of the information entered into the screenshot 400. As indicated with respect to screenshot 600, the screenshot 400 has been compressed for printing as a result of the user's selection of line 618 from within the dropdown menu 614 of screenshot 600. Thus, the screenshot 700 contains only those fields from screenshot 400 which were actually filled in by the user; i.e., the fields 402, 404, 406, and 408 are contained within a section 310*a* representing a compressed form of the section 310 of screenshot 400. In a portion 312*a* of screenshot 700, a compressed version of section 312 of screenshot 400 is presented, containing details about the biller for the good being ordered. Specifically, a line 702 contains a default selection of details pertaining to a company which is selling the good(s) being ordered. Finally with respect to screenshot 700, a line 704 contains submission information for the ordering information contained within the screenshot 700.

Figure 8:
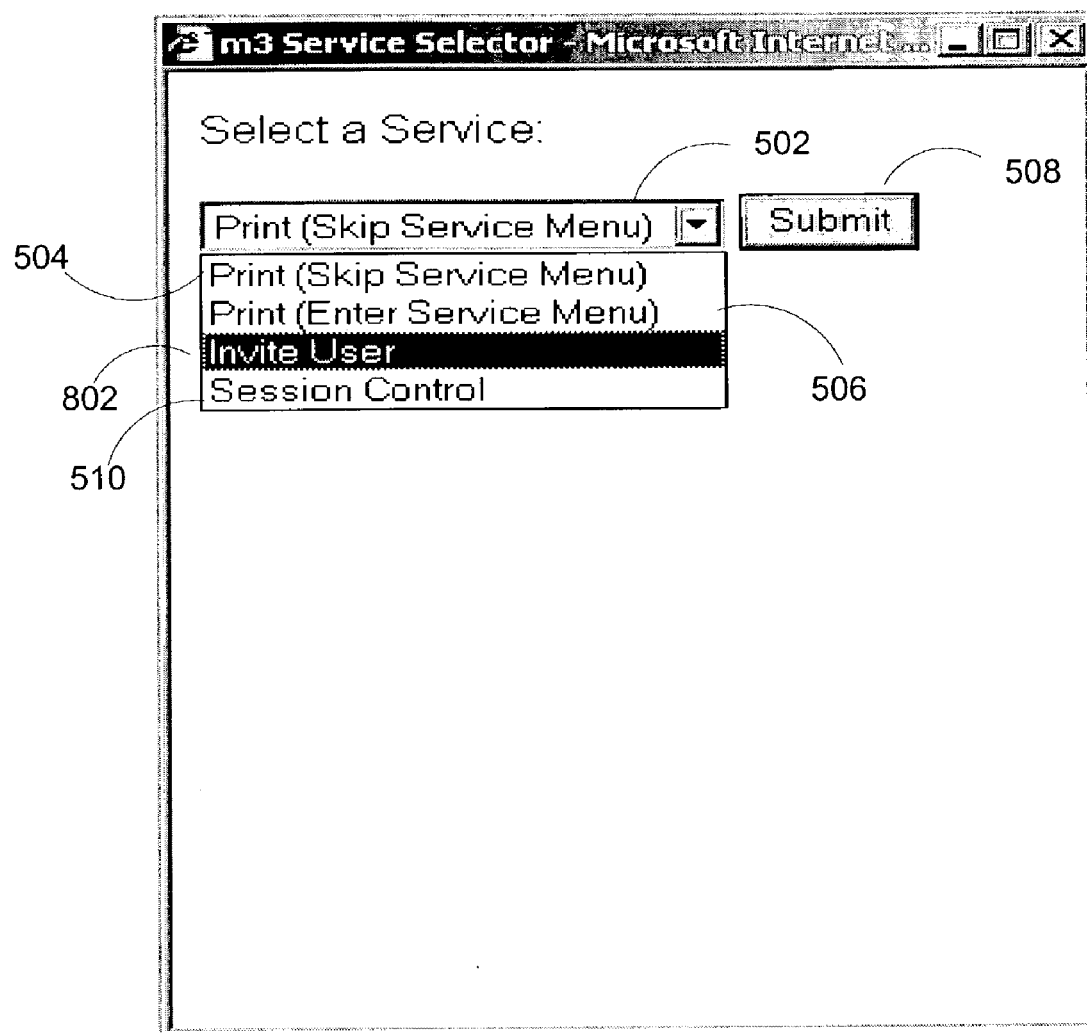
FIG. 8 is a screenshot of the network services menu corresponding to the screenshot of FIG. 5.

FIG. 8 is a screenshot 800 of the network services menu corresponding to the screenshot 500 of FIG. 5. That is, the screenshot 800 is essentially identical to the screenshot 500 of FIG. 5, and is also presented to the user in response to a selection by the user of the services link 314 in screenshot 400 of FIG. 4. In screenshot 800, as opposed to screenshot 500, the user has selected a highlighted line 802, indicating that the user wishes to have access to the network service of a multi-user collaboration session.

Figure 9:
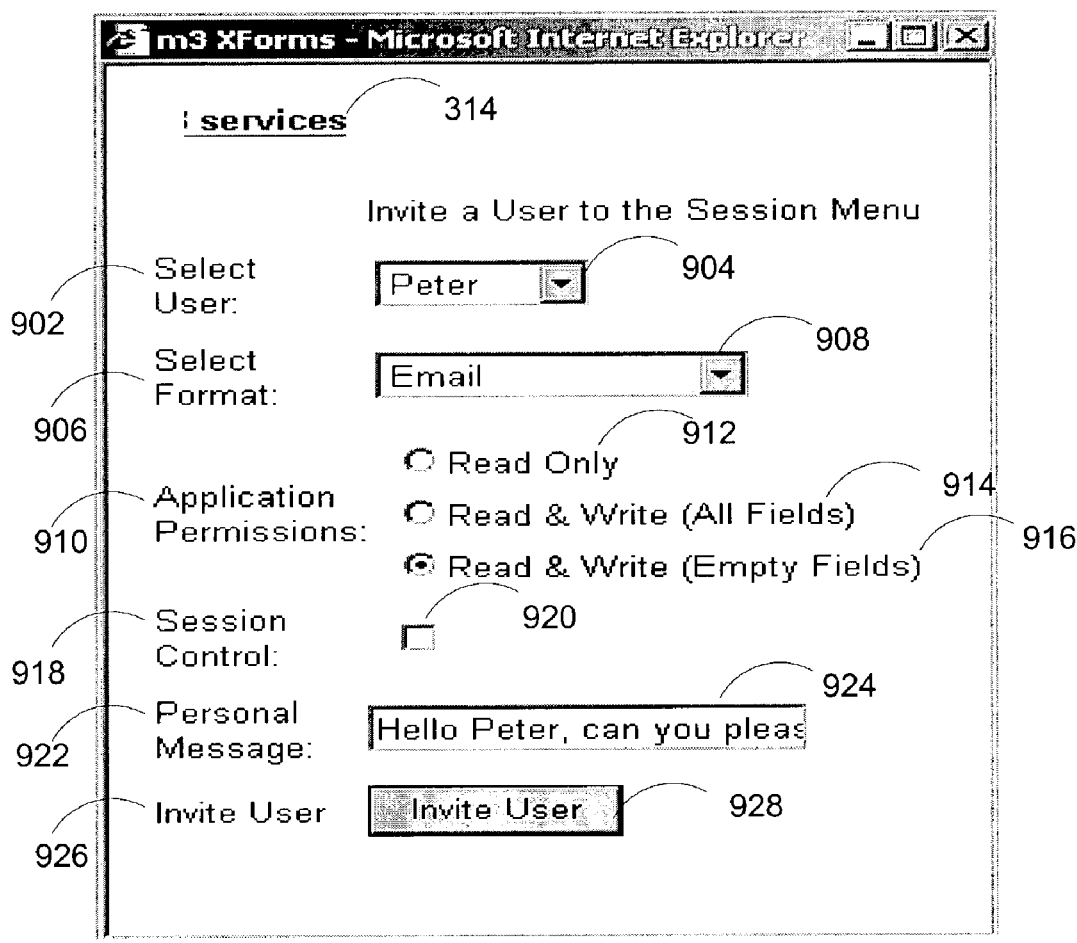
FIG. 9 is a screenshot illustrating a technique for inviting a user to a multi-user session.

FIG. 9 is a screenshot 900 illustrating a technique for inviting a user to a multi-user session. In screenshot 900, a line 902 allows an inviting user to select a second user as an invitee to the current session. Specifically, a dropdown menu 904, which lists all currently-available users, is included in the line 902. A line 906 allows the inviting user to select a format with which he or she will contact the invitee. In line 906, a dropdown menu 908 is provided, which lists the various available invitation formats. In the dropdown menu 908, the displayed format is e-mail.

In a section 910 of screenshot 900, the inviting user is able to set permission levels which will be granted to the invitee, should the invitee agree to join the session. Specifically, a first line 912 provides the inviting user the option of allowing the invitee to merely read the content of the application included within the session, i.e., the invitee will not be able to alter any of the content while participating in the session. Conversely, a line 914 allows the inviting user to grant permission to the invitee to both read and write to the application content, within all available fields included within the content. Finally, in a line 916, the inviting user is provided with the option of allowing the invitee to read all fields within the application, but to write to (i.e., modify) only those fields within the application form which have been left empty by the inviting user (this option is discussed in more detail with respect to FIGS. 10-16).

A line 918 allows the inviting user to decide whether to allow the invitee a level of control of the session, i.e., a box 920 is included in the line 918, which may be checked by the inviting user in order to grant this permission to the invitee. A line 922 allows the inviting user to send a personal message to the invitee along with the invitation to join the session. A field 924 is provided within the line 922, in which the inviting user may enter the personal message. Finally with respect to the screenshot 900, a line 926 allows the inviting user to actually initiate the invitation by clicking on an "invite user" button 928.

Figure 10:
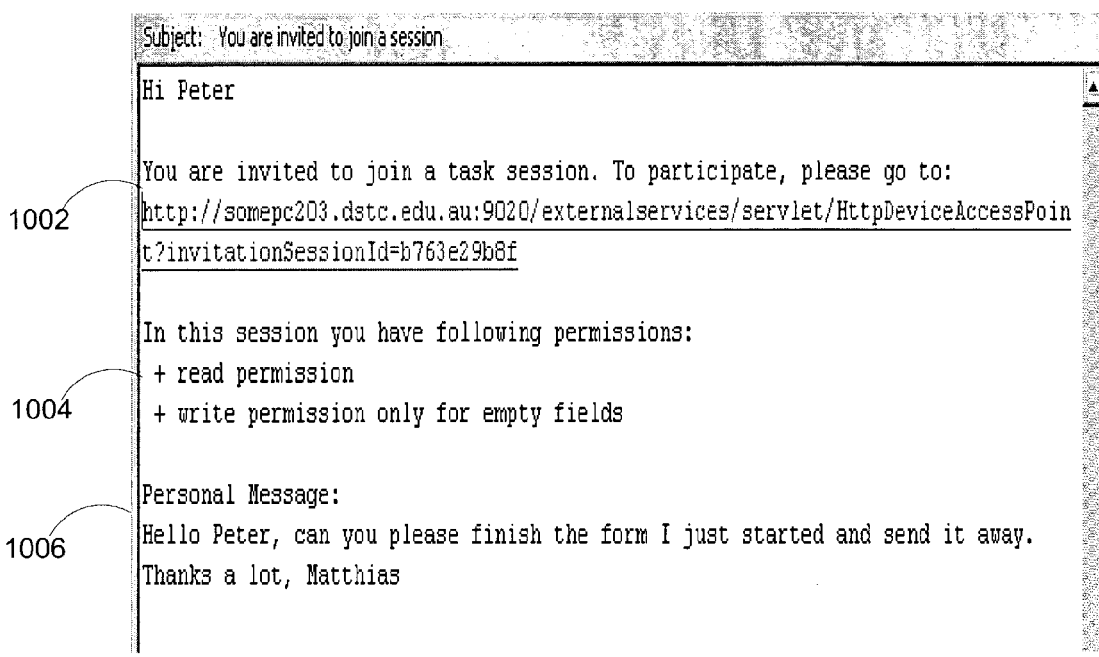
FIG. 10 is a screenshot illustrating an e-mail received by a user being invited to join an active session.

FIG. 10 is a screenshot 1000 illustrating an e-mail received by a user being invited to join an active session. The screenshot 1000 includes a first section 1002 which informs the invitee that he or she has been invited to join a session, as well as a link 1004 which the invitee may select in order to connect with the session manager 114, and thereby join the session. A second section 1006 informs the invitee of permissions which have been granted to the invitee for the session. In the section 1006 of screenshot 1000, the permissions granted to read the entire content of the session, but to write only to empty fields within the application(s) included with the session, reflects the selection of the inviting user made in section 910 and line 916 of screenshot 900. Finally, in a section 1008, the personal message provided by the inviting user within the field 924 of screenshot 900 is included.

Figure 11:
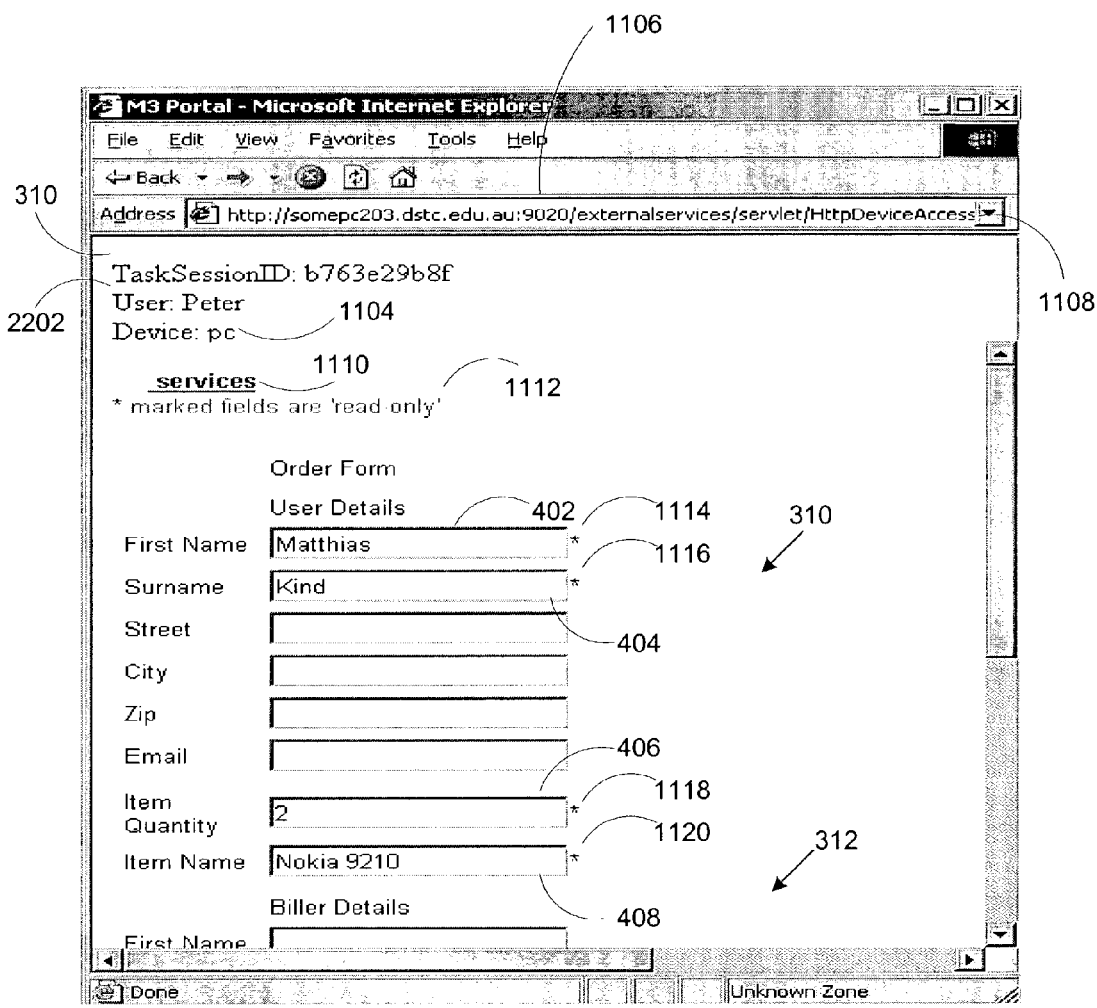
FIG. 11 is a screenshot illustrating session information displayed to a user.

FIG. 11 is a screenshot 1100 illustrating session information displayed to the invited user. As in the screenshot 300 of FIG. 3, the screenshot 1100 includes a line 1102 identifying the current user (in this case, the user "Peter," as indicated in the line 902 and dropdown menu 904 of screenshot 900), as well as a line 1104 indicating the type of device used by the user to connect to the session (in this case a PC). Also as in screenshot 300, a port number 1106 associated with the application server 102 is identified within a URL 1108. The user, device, and port number information, as in screenshot 300, are used to identify and authenticate the relevant user.

The line 310 in screenshot 1100, as shown by use of the same reference number, is identical to the line 310 in screenshot 300, indicating that the two authenticated users are, in fact, participating in the same active session. Conversely, a services link 1110 in screenshot 1100 may be different from the services link 314 in screenshot 300, in that the services link 1110 may provide a different network resource menu to the user of screenshot 1100 (i.e., the invitee), based on such factors as a type of connection employed by the invitee, a network authorization level associated with the invitee, or a current location of the invitee.

Also in screenshot 1100, a line 1112 indicates to the invitee that fields within the screenshot 1100 marked with an asterisk ("*") are "read-only," i.e., the invitee will only be able to read these fields, and will not be able to alter any content of the fields. Accordingly, the fields 402, 404, 406 and 408 within section 310A, which are identical to corresponding sections within the screenshot 400 that is currently being viewed by the inviting user, are marked with asterisks 1114, 1116, 1118, and 1120, respectively.

As can be seen by the personal message relayed to the invitee from the inviting user and illustrated in section 1008 of screenshot 1000, the inviting user has asked the invitee to complete the partially completed application form currently being viewed by both parties (and illustrated in screenshots 400 and 1100). A potential difficulty in this arrangement stems from the fact that both users are currently active within the same session. As a result, both parties are capable of writing to any given field at the same moment (assuming that the invitee has permission to write to that field). To prevent this eventuality, the application server 102 may detect that one user has selected a field for data entry, and notify the other user(s) accordingly.

However, in an HTML environment such as that discussed above, a server such as the application server 102 is generally not configured to "push" information to a client, i.e., is not configured to initiate the sending of a message to the client (without some pre-configured order/request to do so). That is, a server-client environment in the context of, for example, the World Wide Web, generally exhibits a request (e.g., a "refresh" or "re-load" request) from the client, and a corresponding response from the server. As a result, when the application server 102 determines that a user (e.g. the invitee) within an active session has selected a field for data entry, the application server 102 is generally not equipped to notify other users (e.g., the inviting user) of this fact.

One example of how to accomplish this functionality is to include an automatic refresh of a screen within a browser being used by the party not currently entering information into the application form. For example, a "meta-tag" for refreshing a web page can be inserted into the HTML source code for that web page, which automatically refreshes the web page at some predetermined interval, i.e., every 10 seconds. In this way, as the user views the screen, the web page will refresh periodically, and if, in the meantime, another user has begun to enter information into a particular field, then this information will be reflected in the refreshed version of the first user's screen.

Another technique for alerting the first user that the second user has selected a field for data entry involves the use of a "hidden frame" within the web page(s). Frames within a web page typically divide the page into two or more sections, where each frame is assigned a predetermined portion of the screen. Each frame is essentially an independent web page in the sense that it has its own URL, and can be operated as its own web page, and can communicate with other frames within the set of frames. A "hidden frame" is a frame with a size set to zero (0), so that the frame may contain information that is not immediately viewable to a user of the web page. The hidden frame(s) can thus be automatically refreshed separately from the viewable frame, and can be designed so as to update only one field at a time within the mainframe. In this way, a time needed to refresh the main page is reduced significantly. The use of such hidden frames is discussed in more detail below, with respect to FIGS. 12-15.

Figure 12:
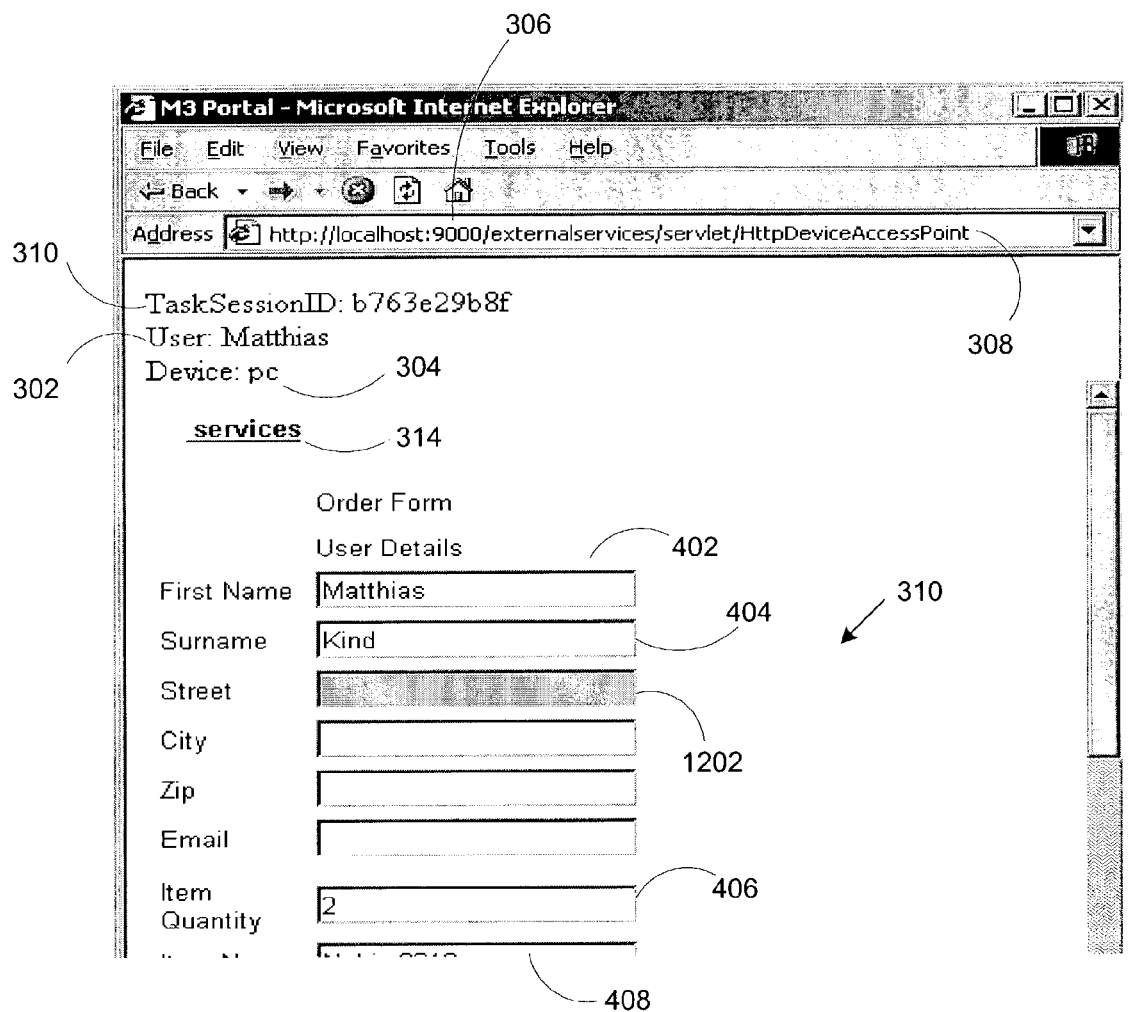
FIG. 12 is a screenshot illustrating a screen viewed by a first user while a second user enters information in a selected field within the screen.

FIG. 12 is a screenshot 1200 illustrating a screen viewed by a first user while a second user enters information in a selected field within the screen. In screenshot 1200, which corresponds to the screenshot 400 of FIG. 4 (i.e., is being viewed by the inviting user), a field 1202 for entering street address information is highlighted. By highlighting field 1202 as shown in screenshot 1200, the session manager 114 indicates to a viewer of screenshot 1200 that a corresponding field in the screen of the invitee is currently being (or is about to be) filled in by the invitee, i.e., has been selected by the invitee.

In order to highlight the field 1202, a hidden frame(s) may be incorporated into the source code for screenshot 1200. As described above, this hidden frame may be associated with the field 1202, and may be refreshed/updated periodically, so that any changes with respect to a particular field within the screenshot 1100 (also see FIGS. 13 and 15 below) of the invitee are promptly reflected within the field 1202 of the screenshot 1200.

Figure 13:
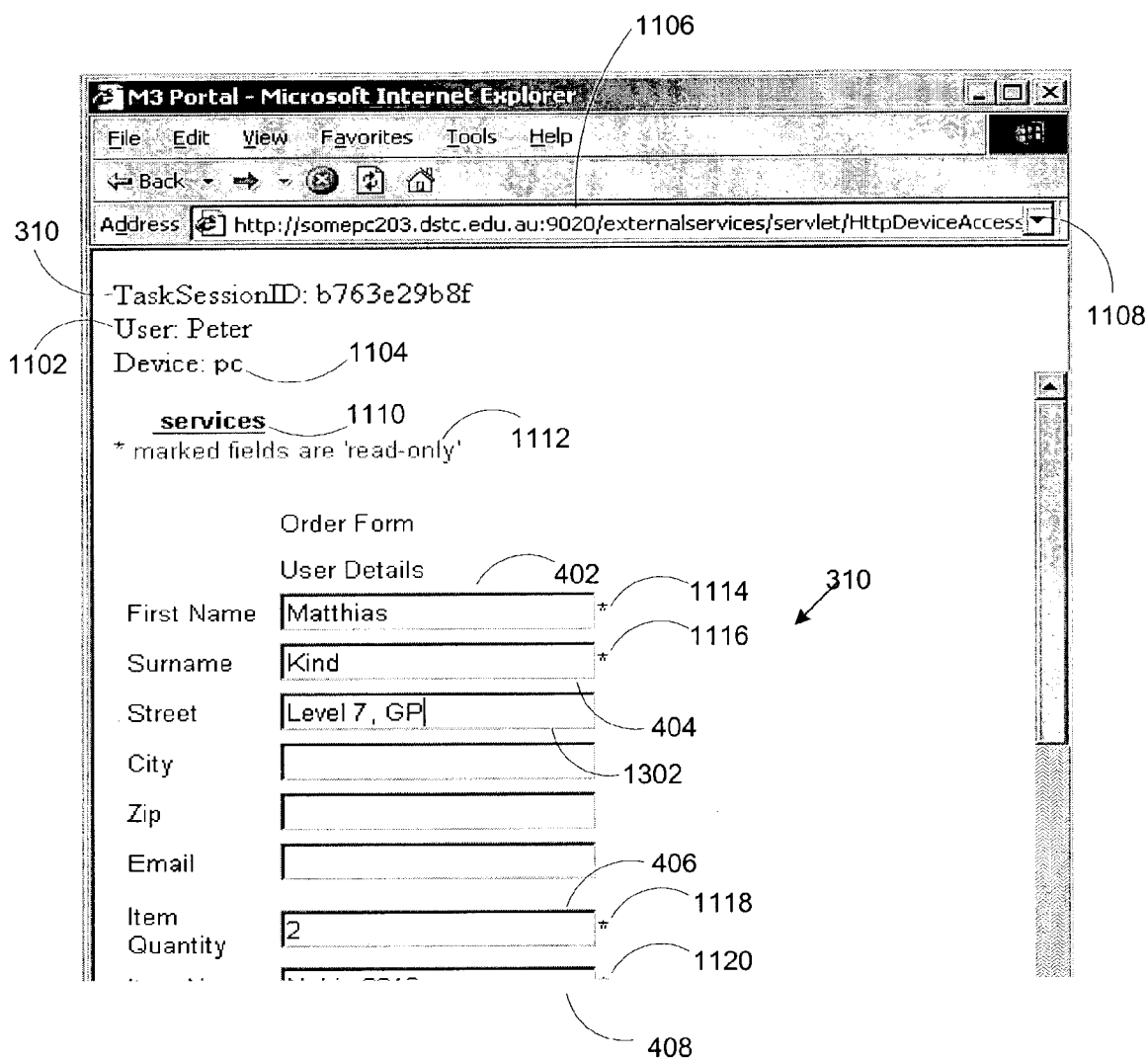
FIG. 13 is a screenshot illustrating an input of information.

FIG. 13 is a screenshot 1300 illustrating an input of information, as viewed by the invitee, and corresponds to the screenshot 1200 of FIG. 12. In screenshot 1300, a field 1302 (corresponding to field 1202 of screenshot 1200), illustrates that the invitee has selected the field 1302 for completion, and is in the process of filling in street address information into the field 1302.

The selection of the field 1302 by the invitee is detected by the application server 102. Thus, when the application server 102 performs its next refresh of the hidden frame(s) of the screenshot 1200, the field 1202 may be highlighted, as described above, to reflect the selection of field 1302.

Figure 14:
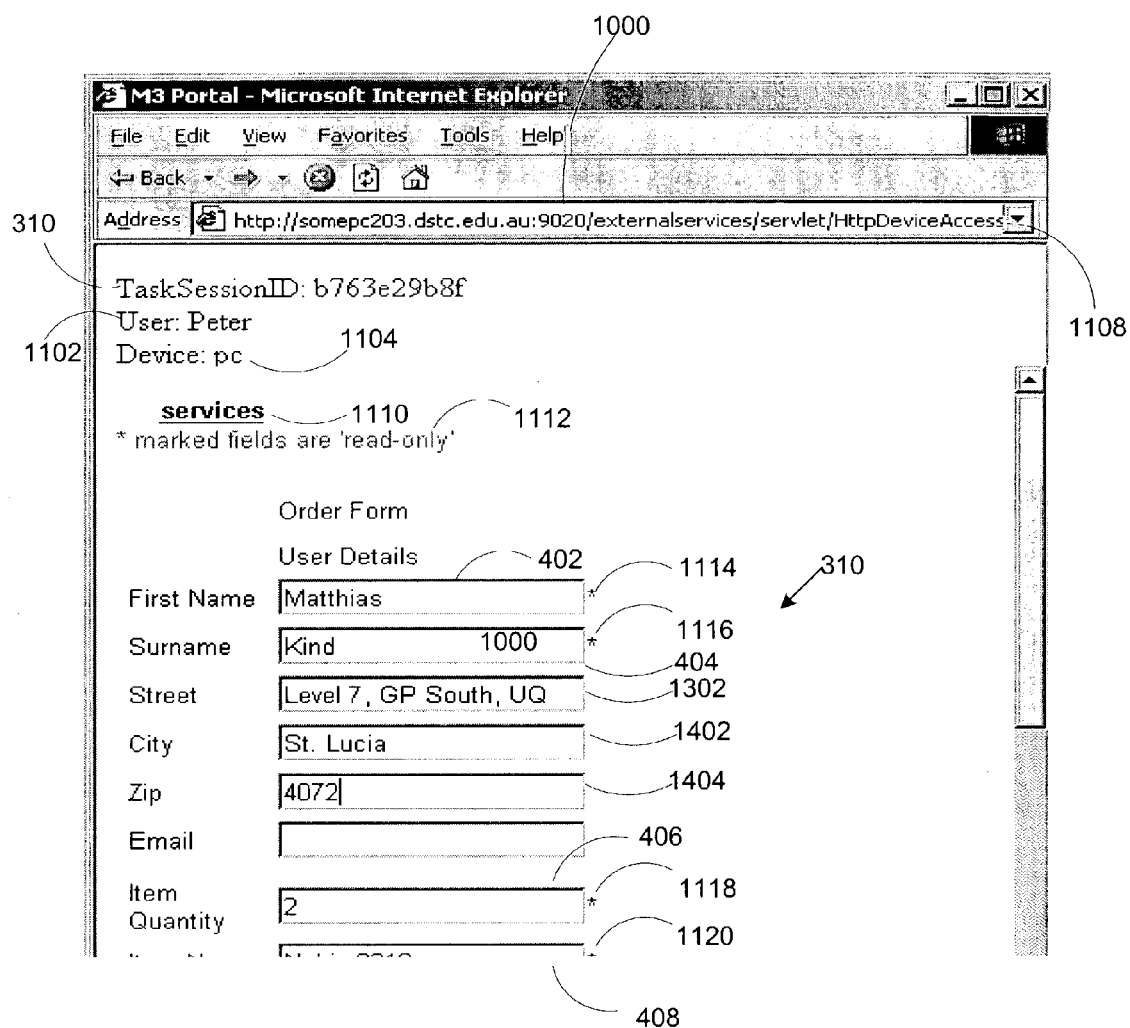
FIG. 14 is a screenshot which continues the example of the screenshots of FIGS. 12 and 13.

FIG. 14 is a screenshot 1400 which continues the example of screenshots 1200 and 1300 in FIGS. 12 and 13, respectively. Specifically, in screenshot 1400, the invitee continues to fill in fields within the section 310, including a field 1402 related to city information, and a field 1404 related to zip code information. In screenshot 1400, the invitee has already completed the field 1402, and has moved on to partially complete entry of zip code information into field 1404.

Figure 15:
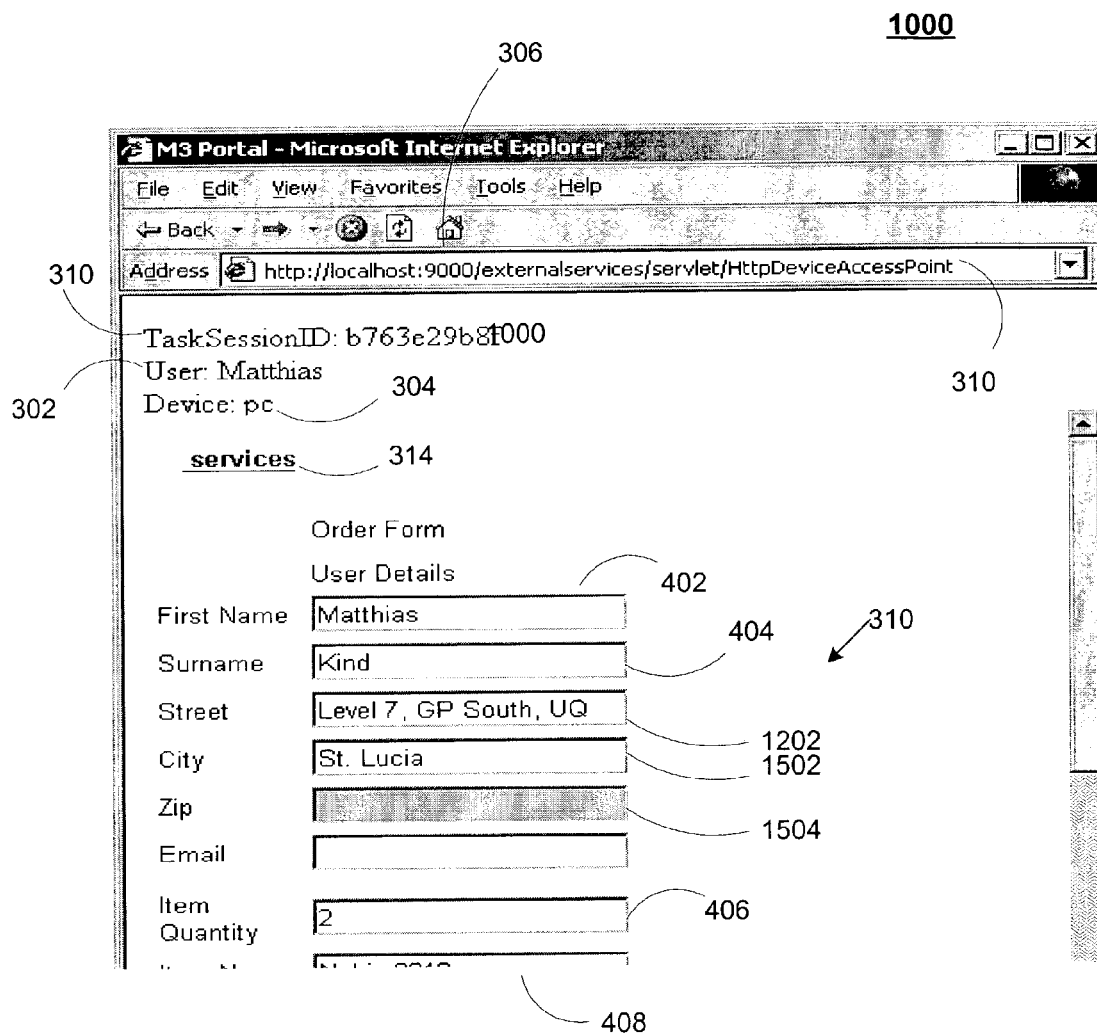
FIG. 15 is a screenshot corresponding to the screenshot of FIG. 14.

Therefore, in FIG. 15, corresponding fields in a screenshot 1500 (being viewed by the inviting user) reflect the current status of screenshot 1400. Specifically, a field 1502 related to city information indicates that, in fact, the invitee has completed entry of city information within his or her corresponding field 1402. Meanwhile, in a field 1504 related to zip code information, the field 1504 is highlighted, similarly to the field 1202 in screenshot 1200, thereby indicating to the inviting user that the invited user is about to begin (or is currently) entering zip-code information.

As illustrated in FIGS. 12-15, a first user within a multi-user session is able to enter information into an application form, while a second user within the multi-user session is alerted to the information entry by a series of highlighted fields within the second user's field of view. As the first user enters information into a first field, and then moves on to the second field, the information entered into the first field may be transmitted back to the session manager 114, which may store the information in a buffer (not shown). The session manager 114 may thus distribute the buffered information to a corresponding field within a screen currently being viewed by the second user.

Figure 16:
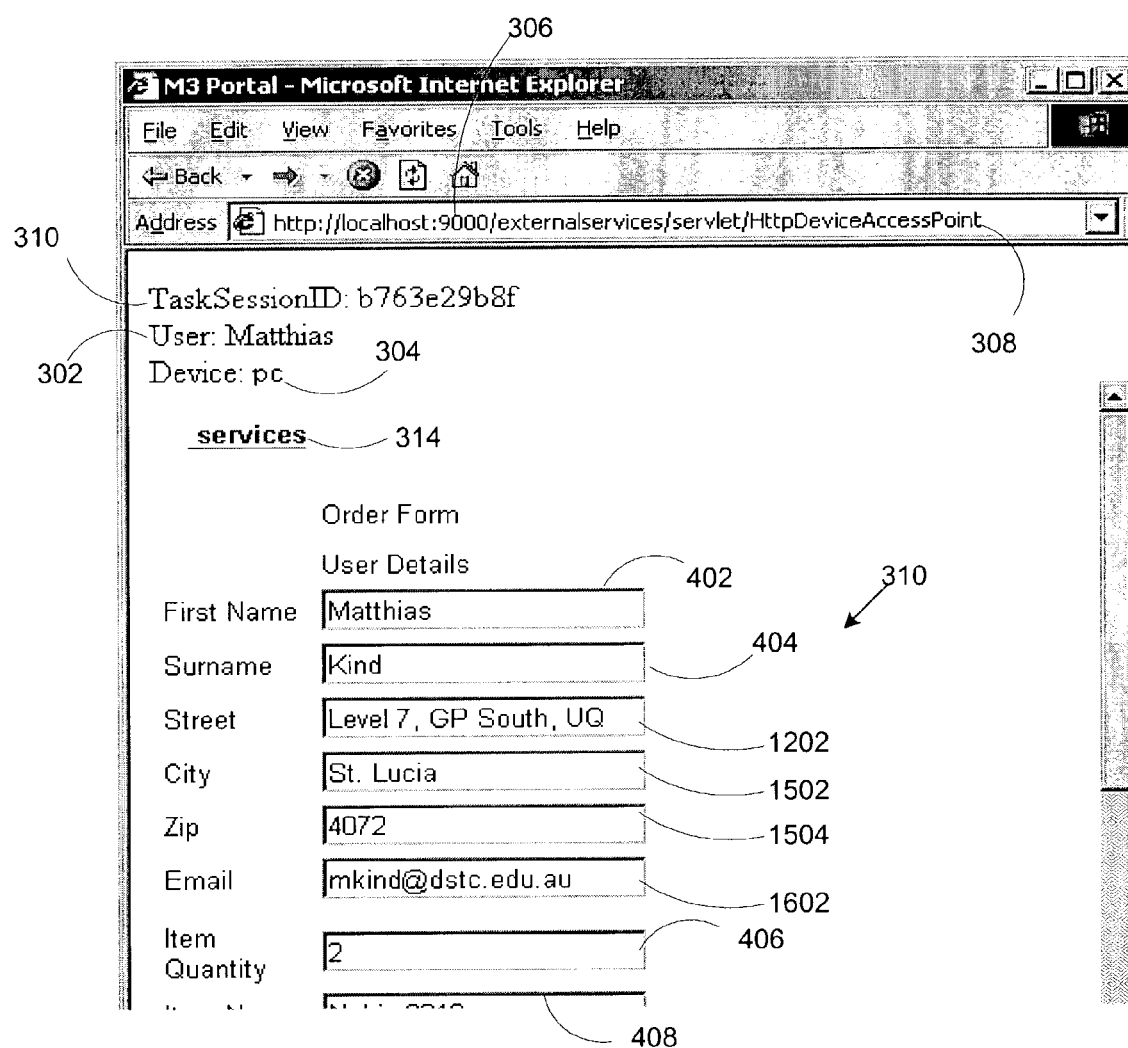
FIG. 16 is a screenshot illustrating session control activity of an inviting user.

FIG. 16 is a screenshot 1600 illustrating session control activity of an inviting user. In screenshot 1600, all fields within the section 310 have been completed, including a field 1602 for entering e-mail information. Therefore, the inviting user, having determined that the application form has been successfully completed by the invitee, selects the services link 314, and is provided with a session control menu, as illustrated in FIG. 17.

Figure 17:
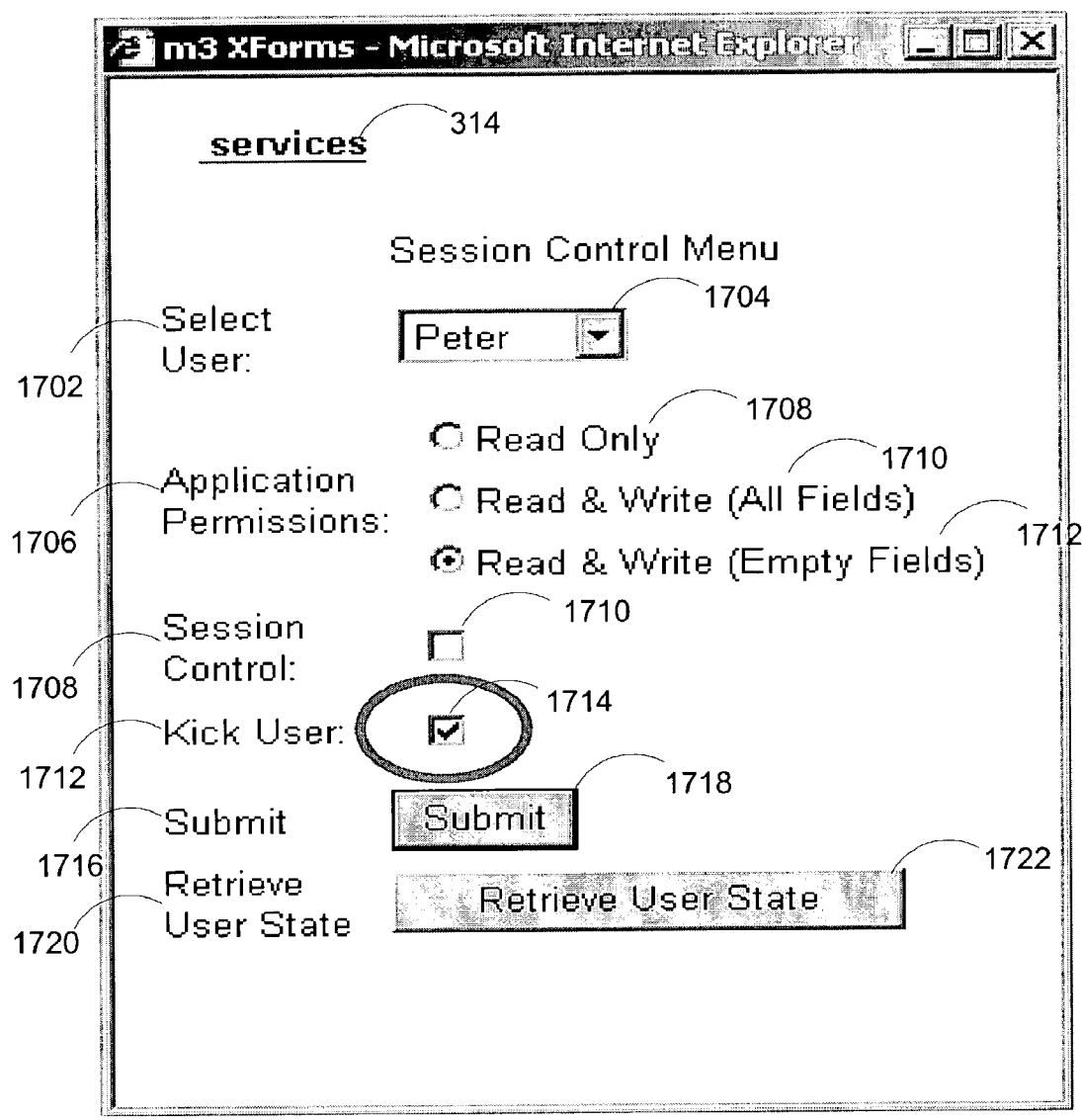
FIG. 17 is a screenshot of a session control menu.

FIG. 17 is a screenshot 1700 of a session control menu. It should be understood that screenshot 1700 may be reached by a user via a network resource control menu, such as that shown in screenshots 500 and 800 of FIGS. 5 and 8, respectively. Screenshot 1700 is similar to screenshot 900 of a user invitation menu. Specifically, screenshot 1700 includes a line 1702 for selecting a user whose session permission levels will be altered. A dropdown menu 1704 listing all users within the active session is also included. A section 1706 lists current application permissions for the user selected from the dropdown menu 1704. Specifically, as in the screenshot 900, a line 1708 indicates a "read only" permission, a line 1710 indicates a "read and write (all fields)" permission, and a line 1712 indicates a "read and write (only empty fields)" permission.

As already shown in the screenshot 900, the line 1712 indicating a restricted read/write capability is currently selected for the user indicated in the dropdown menu 1704. A line 1708 indicates whether the user in the dropdown menu 1704 has any level of session control. As indicated by a non-selection of a box 1710, and as already discussed with respect to screenshot 900, the user in this example does not have session control permission.

In line 1712, an option to remove the user listed in the dropdown menu 1704 from the current active session is provided. Specifically, a box 1714 is checked to indicate that, in this case, the user in the dropdown menu 1704 is to be removed from the active session. A line 1716 includes a button 1718 for submitting the information contained with the session control menu screenshot 1700 to the session manager 114. Finally, a line 1720 includes a button 1722 which provides the ability to retrieve current state information about the user listed in the dropdown menu 1704, with respect to the currently active session.

Figure 18:
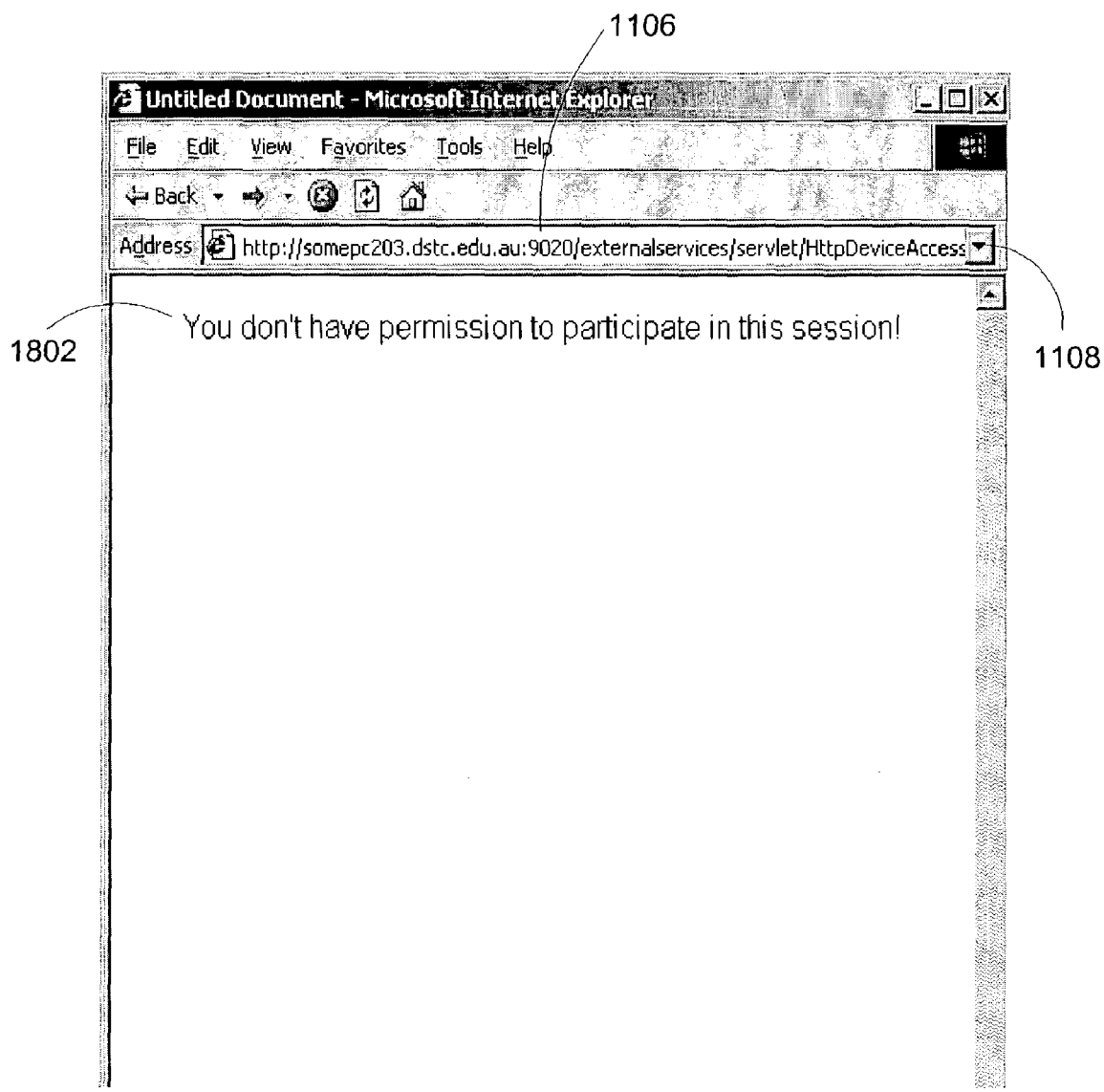
FIG. 18 is a screenshot indicating a result of the action selected in the session control menu screenshot of FIG. 17.

FIG. 18 is a screenshot 1800 indicating a result of the action selected in the session control menu screenshot 1700 of FIG. 17. In screenshot 1800, the previously-invited user is presented with a line 1802, which indicates that the user no longer has permission to participate in the active session.

In the above examples, the session manager 114 augments an application form with a link to a network services menu, whereby users may select particular network resources and/or services from the menu. Examples of network resources or services which may be remotely provided to users include remote printing, multi-user sessions, and remote control of session information or parameters.

As mentioned above, other network resources or services also may be provided. For example, remote usage of network storage capabilities could be included within the network resource menu. In this case, a storage directory may be provided to the user, or by the user may select a particular folder or file in which to store the application form. As a final example of the network service that may be remotely provided to a user, a "chat" mechanism may be implemented, whereby two users within an active session may directly communicate with one another. For example, when two users are participating in a multi-user session such as that described above with respect to FIGS. 8-16, a separate, "pop-up" window may be provided within screens of both users, whereby the users may directly exchange messages within the secondary pop-up window. Such form could be an addition to, or an alternative to, the primary application collaboration form.

In providing these and other network resources, the implementations described herein are capable of operating with pre-configured applications, without requiring re-writing of the applications to do so. As a result, the implementations may be easily deployed, and may be useful in a wide variety of network settings.

A number of implementations have been described. Nevertheless, it will be understood that various modifications may be made. Accordingly, other implementations are within the scope of the following claims.

What is claimed is:

1. A method for managing network resources, the method comprising:
   retrieving application content, during a session opened with a user at a first remote location, in response to a user request;
   analyzing a format of the retrieved application;
   augmenting, based on the analysis, the application content with a navigation link for linking to a network resource menu, the network resource menu providing access to at least a network device and invitation options for inviting other users to concurrently modify the application content during the session; and
   providing the augmented application content to the user via the session.

2. The method of claim 1, further comprising:
   receiving a network resource order via the connection; and
   implementing the network resource order.

3. The method of claim 1, wherein providing the augmented application content occurs via a remote connection with the user.

4. The method of claim 1, wherein the network device includes a printer.

5. The method of claim 1, wherein the network device includes an email server.

6. The method of claim 1, wherein the network device includes storage.

7. The method of claim 6, further comprising:
   receiving a network resource request via the navigation link; and
   presenting a directory structure of network storage space available to the user.

8. The method of claim 1, further comprising handling a use of the network device on behalf of the user and in response to a user request.

9. The method of claim 1, further comprising:
   inviting, by an application server and based on invitation options selected via the navigation link, a second user to modify the application content at a second remote location concurrently with a first user at the first remote location; and
   distributing, by the application server, detected modifications of the application content by the first user and the second user to the first and second remote locations.

10. The method of claim 9, wherein the distributing comprises:
    modifying the application content based on a modification performed by the first user;
    updating the application content in response to the modification; and
    providing the updated application content to the second user.

11. The method of claim 10, wherein modifying the application content comprises:
    receiving the modification within a first hidden browser frame that is not viewable by a first browser being accessed by the first user; and
    providing a view of the modification to the second user via a second hidden browser frame not viewable within a second browser being accessed by the second user, the second hidden frame updating an associated field viewable within the second browser.

12. A computer having a storage medium with a program stored thereon, the program being accessible by a processor for implementation thereof and comprising executable instructions that cause the processor to:
    retrieve application content from an application repository during a live connection with a user at a first remote location;
    analyze a format of the retrieved application content;
    augment the application content with a navigation link based on the analysis, the navigation link providing the user with access to a resource selection framework for selecting at least a network device and invitation options for inviting other users to concurrently modify the application content during the session;
    provide the augmented application content to the user; and
    receive a network resource selection from the user.

13. The apparatus of claim 12, further comprising:
    executable instructions that cause the processor to manage a network resource on behalf of the first user and in accordance with the network resource selection.

14. The apparatus of claim 12, wherein the live connection is a remote connection with the user.

15. The apparatus of claim 12, wherein the network device includes at least one of a printer, a storage database, and an email server.

16. The apparatus of claim 12, further comprising:
    in response to the received network resource selection, activating a session manager to invite a second user to modify the application content at a second remote location concurrently with a first user at the first remote location and distribute detected modifications of the application content link by the first and second users to the first and second remote locations.

17. The apparatus of claim 16, further comprising:
executable instructions that cause the processor to associate a browser frame that is non-viewable to the first and the second user with the application content, the browser frame incorporating information regarding operations of the first user with respect to the application content for display thereof to the second user.

18. The apparatus of claim 12, further comprising executable instructions that cause the processor to analyze the application content format to determine an optimal manner in which to augment the application content with the navigation link.

19. A resource management system, the system comprising:
an application interface operable to access application content in an application database;
a resource handler operable to interface with a network resource; and
a session manager operable to:
obtain the application content via the application interface,
analyze a format of the obtained application content,
augment, based on the analysis, the application content with a navigation link for linking to a network resource menu, the network resource menu providing access to information about the network resource and invitation options for inviting a plurality of users to concurrently modify the application content, and
output the augmented application content to a user.

20. The system of claim 19, wherein the resource handler is further operable to monitor a status of the network resource and access rights of the user to the network resource.

21. The system of claim 19, wherein the navigation link provides a link to a resource selector interface provided to the user by the session manager in conjunction with the resource handler.

22. The system of claim 19, wherein the application interface presents the application content to the session manager in a format amenable to inclusion of the navigation link.

23. The system of claim 19, wherein the application interface, resource handler and session manager are co-located within a server.

24. The system of claim 19, wherein the session manager is a proxy server located separately from a server housing the application interface and the resource handler.

25. The system of claim 19, wherein the network resource is a printer, a storage database or an email server.

26. The system of claim 19, wherein the session manager is further operable to invite a plurality of users to concurrently modify the application content from a plurality of different remote locations and distribute modifications of the application content by the plurality of users among the plurality of different remote locations.

27. The system of claim 26, wherein each of the plurality of users views the application content on a graphical user interface supporting frames.

28. The system of claim 27, wherein the session manager is further operable to track an input of a first user of the plurality of users via a first frame that is non-viewable to the first user, and output the input to remaining ones of the plurality of users via a second frame that is non-viewable to the remaining ones of the plurality of users.

29. The system of claim 26, wherein the session manager invites the plurality of users to concurrently modify the application content via an email server accessed via the network resource.

30. The system of claim 19, wherein the session manager dynamically constructs a page for viewing by the user on a graphical user interface, the page including the application content and the navigation link to the network resource menu.

31. The system of claim 30, wherein the page further includes a hidden frame that is operable, via the session manager, to track modifications to the application content entered by a first user and report the modifications to remaining users.

32. The system of claim 31, wherein the session manager is further operable to highlight a portion of the page being modified by the first user, as the page is being concurrently viewed by the remaining users.

33. The system of claim 18, wherein the session manager is further operable to receive a network resource request from the user, based on the connection the network resource menu, and manage a usage of the network resource by the user on the user's behalf.

34. The system of claim 19, wherein the session manager is an application written as a Java servlet.

35. The method of claim 1, wherein analyzing a format of the application content comprises analyzing the application content format to determine an optimal manner in which to augment the application content with the navigation link.

36. The method of claim 1, wherein augmenting the application content comprises populating the network resource menu by retrieving network resource descriptions based on information associated with the user.

37. The system of claim 19, wherein the session manager is operable to analyze the application content format to determine an optimal manner in which to augment the application content with the navigation link.

38. A method for managing network resources, the method comprising:
retrieving, at an application server, an electronic document in response to a user request during a session opened with a first user of a first remote web browser;
analyzing a format of the retrieved electronic document;
augmenting the retrieved electronic document with a selectable link to a network resource menu based on the analysis, the network resource menu providing access to an invitation option for inviting other users to concurrently modify the electronic document during the session and to at least one of a printer, an e-mail server, and storage facilities;
providing the augmented document to the first user during the session via the first remote web browser;
providing, in response to a selection of the invitation option, an identification of a second user, available invitation formats for inviting the second user, and available access levels for the second user;
initiating, by the application server, an electronic communication to the second user that invites the second user to modify the electronic document at a second remote web browser in accordance with a selected invitation format and a selected access level; and
distributing, by the application server, detected modifications of the electronic document by the first and second users to the first and second remote web browsers by incorporating hidden frames within source code for displaying the electronic document on the first and second web browsers.

39. The method of claim 38, further comprising:

providing the electronic document to the second user with a selectable link to a second network resource menu, the second network resource menu different than the network resource menu provided to the first user.

40. The method of claim 38, wherein distributing detected modifications comprises:

buffering modifications to a field of the electronic document as the modifications are input to the field via the second web browser; and distributing the buffered modifications to a corresponding field in the augmented document viewable via the first web browser.

41. The method of claim 38, wherein distributing detected modifications comprises highlighting a field in the augmented document, the field corresponding to field being modified by the second user from the second web browser.

* * * * *